(12) United States Patent
Johnson et al.

(10) Patent No.: US 7,584,195 B2
(45) Date of Patent: Sep. 1, 2009

(54) DECOMPOSING INSTALLATION OF DISTRIBUTED SERVICES

(75) Inventors: Gregory C. Johnson, Bellevue, WA (US); Mashuri R. Libman, Woodinville, WA (US); William B. Lees, Redmond, WA (US); William S. Jack, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 11/290,961

(22) Filed: Nov. 30, 2005

(65) Prior Publication Data

US 2007/0124308 A1 May 31, 2007

(51) Int. Cl.
*G06F 17/30* (2006.01)
(52) U.S. Cl. ............ 707/10; 707/1; 707/2; 707/4; 707/100; 707/200; 707/201; 706/45; 709/203; 717/170; 717/171; 717/174; 717/175; 717/177
(58) Field of Classification Search ............ None
See application file for complete search history.

(56) References Cited

U.S. PATENT DOCUMENTS

| | | | |
|---|---|---|---|
| 5,761,380 A * | 6/1998 | Lewis et al. | 706/47 |
| 6,301,708 B1 * | 10/2001 | Gazdik et al. | 717/175 |
| 6,347,397 B1 * | 2/2002 | Curtis | 717/170 |
| 6,460,175 B1 | 10/2002 | Ferri et al. | |
| 6,490,722 B1 * | 12/2002 | Barton et al. | 717/174 |
| 6,918,112 B2 * | 7/2005 | Bourke-Dunphy et al. | 717/177 |
| 2002/0188941 A1 * | 12/2002 | Cicciarelli et al. | 717/175 |
| 2003/0208595 A1 * | 11/2003 | Gouge et al. | 709/225 |
| 2005/0102665 A1 * | 5/2005 | Barta et al. | 717/174 |
| 2005/0102667 A1 * | 5/2005 | Barta et al. | 717/174 |
| 2005/0172283 A1 * | 8/2005 | Delo | 717/174 |

(Continued)

FOREIGN PATENT DOCUMENTS

GB          2413653          11/2005

OTHER PUBLICATIONS

Douglas C. Schmidt and Paul Stephenson Department of Information and Computer Science, University of California, Irvine, CA 92717 Ericsson Business Communications, Inc., Cypress, CA 90630 "An Object-Oriented Framework for Developing Network Server Daemons", pp. 1-15 http://www.cs.wustl.edu/~schmidt/PDF/C++-world-93.pdf.

(Continued)

*Primary Examiner*—Mohammad Ali
*Assistant Examiner*—Farhan M Syed
(74) *Attorney, Agent, or Firm*—Workman Nydegger (57) ABSTRACT

Communicating with a distributed service in the network computing environment. A method for communicating with a distributed service includes referencing a configuration registry to determine resources and permissions in a potential distributed service entry. A potential distributed service entry identifies a distributed service corresponding to the potential distributed service entry that is authorized to exist by virtue of an entry in the configuration registry for the potential distributed service entry specifying that the distributed service may exist, whether or not the distributed service corresponding to the potential distributed service entry exists. The method further includes using the resource information, attempting to contact the distributed service corresponding to the potential distributed service entry. Permissions of the distributed service corresponding to the potential distributed service entry are verified to match permissions of the potential distributed service entry.

20 Claims, 2 Drawing Sheets

U.S. PATENT DOCUMENTS

2005/0251786 A1* 11/2005 Citron et al. ................ 717/106

OTHER PUBLICATIONS

Richard S. Hall, Dennis Heimbigner, Andre van der Hoek, and Alexander L. Wolf Software Engineering Research Laboratory Department of Computer Science University of Colorado Boulder, CO 80309 USA "An Architecture for Post-Development Configuration Management in a Wide-Area Network", pp. 269-278, 1997 IEEE, http://ieeexplore.ieee.org/search/wrapper.jsp?arnumber=598050.

Naveed Arshad, Dennis Heimbigner and Alexander L. Wolf Department of Computer Science University of Colorado at Boulder "Deployment and Dynamic Reconfiguration Planning for Distributed Software Systems", pp. 1-8, 2003 IEEE, http://ieeexplore.ieee.org/search/wrapper.jsp?arnumber=1250168.

* cited by examiner

DECOMPOSING INSTALLATION OF DISTRIBUTED SERVICES

BACKGROUND

Background and Relevant Art

Computer systems may be networked in distributed fashion such that distributed services are available at different points in the network to provide services to clients on the network. One example of such a distributed network is an enterprise network which includes a number of distributed services, such as distributed services of various types, at various locations in the enterprise network. Often, in an enterprise network, each of the distributed services stores a configuration registry. The configuration registry includes an entry for each distributed service on the enterprise network. The entry for each distributed service may describe the domain of, or services provided by, the distributed service, and location information for the distributed service.

Distributed services may be added to an enterprise network to increase functionality of the enterprise network. For example, by adding an additional distributed service, distributed services can be located in closer proximity to clients. Additionally, workload at existing distributed services can be decreased by offloading work to the new distributed service.

Typically, the process for adding a new distributed service to an enterprise network includes distributed service software being installed on a machine, having the machine contact a helper distributed service for registration and authentication purposes, downloading a copy of the configuration registry to the new machine, adding an entry for the new service to the configuration registry and sending all or part of the configuration registry to the other distributed services in the enterprise network. In this way, each of the distributed services in the enterprise network become aware of the new distributed service and have appropriate information for communication with the new distributed service.

One challenge that occurs with the above described method of adding new distributed services to an enterprise network relates to difficulties that arise when there is a need to repair, re-install, or remove a distributed service from the enterprise network. When a distributed service is repaired or re-installed, these operations can result in a redundant entry in the configuration registry for the distributed service. For example, if a distributed service is reinstalled without first removing the entry of the distributed service in the configuration registry, then the reinstallation process will result in a new entry being added for the distributed service that is a redundant copy of the original entry for the distributed service.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is a method practiced in a network computing environment including distributed services providing services and resources to clients in the computing environment. The method includes various acts for accomplishing communication with a distributed service in the network computing environment. The method includes referencing a configuration registry to determine resources and permissions in a potential distributed service entry. A potential distributed service entry identifies a distributed service corresponding to the potential distributed service entry that is authorized to exist by virtue of an entry in the configuration registry for the potential distributed service entry specifying that the distributed service may exist, whether or not the distributed service corresponding to the potential distributed service entry exists. The method further includes using the resource information, attempting to contact the distributed service corresponding to the potential distributed service entry. Permissions of the distributed service corresponding to the potential distributed service entry are verified to match permissions of the potential distributed service entry.

Another embodiment is a method that may be practiced in a network computing environment including distributed services providing services and resources to clients in the computing environment. The method includes acts for establishing a distributed service in the network computing environment. The method includes installing a data store on a computer system. The data store includes services to establish the distributed service. An established distributed service on the network is consulted to discover updates available for the data store. The updates available for the data store are based on a potential distributed service entry at the established distributed service. The potential distributed service entry specifies permissions for the distributed service. The potential distributed service entry is established independent of installing the data store on the computer system. The method further includes receiving updates to the data store according to the permissions specified in the potential distributed service entry.

Yet another embodiment includes a method that may be practiced, for example, in a network computing environment including distributed services providing services and resources to clients in the computing environment. The method includes acts for communicating between distributed services in the network computing environment. The method includes receiving a request from a distributed service in the network computing environment. A configuration registry, is referenced to determine resources and permissions in a potential distributed service entry. A potential distributed service entry identifies the distributed service. The distributed service is authorized to exist by virtue of an entry in the configuration registry for the potential distributed service entry specifying that the distributed service may exist, whether or not the distributed service exists. The sending a reply to the request to the distributed service that complies with the permissions in the potential distributed service entry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One example of a distributed network is an enterprise network which includes a number of distributed services, such as distributed services of various types, at various locations in the enterprise network. Other types of distributed services may also be implemented such as a forest in a Microsoft Active Directory and the like. While examples of distributed services herein may refer to enterprise networks, it should be understood that the principles described herein are applicable to other types of distributed computing environments.

One embodiment described herein relates to a method of installing a new distributed service to a distributed network, such as an enterprise network, forest, or other distributed network. The method is performed such that installation is performed in a decomposed fashion such that a global installation and a local installation are performed for each new distributed service added to the distributed network.

Illustratively, a global installation may be performed by adding a potential distributed service entry to a configuration registry. While described throughout as a potential service entry, it should be understood that the potential service entry may be embodied as one or more entries in a configuration registry. When used herein, "potential distributed service entry" may include one or more entries. The potential distributed service entry is added without regard to whether or not an actual distributed service or distributed service corresponding to the potential distributed service entry is ever added to the distributed network. The potential distributed service entry may identify a distributed service corresponding to the potential distributed service entry. The potential distributed service entry may include information such as information indicating that a distributed service corresponding to the potential distributed service entry is authorized to exist by entry by virtue of the entry in the configuration registry for the potential distributed service entry specifying that the distributed service may exist. The potential distributed service entry may further include information such as resources that help to identify the location of the distributed service corresponding to the potential distributed service entry. The potential distributed service entry may further include information that specifies a distributed service authority level for the distributed service corresponding to the potential distributed service entry. The potential distributed service entry may further include information that specifies a designated user for the distributed service corresponding to the potential distributed service entry. Each of these entries will be discussed in more detail below. A global installation can be performed for a new distributed service at one of the existing distributed services in the distributed network and then populated out to other distributed services in the distributed network. In this way, each of the distributed services in the distributed network maintains in its local copy of the configuration registry an indication of the allowability of the new distributed service to function on the distributed network. Additionally, each of the distributed services in the distributed network has the information available to contact the new distributed service corresponding to the potential distributed service entry in the configuration registry.

Disjointed from the global installation of the distributed service is a local installation of the distributed service. A distributed service may be added at a local machine for use in a distributed network. The configuration registry may include information that delegates the ability to install and/or maintain the new distributed service to some particular designated user. In an alternative embodiment, any designated user may install the new distributed service locally. In any case, software for the new distributed service may be installed at the local machine. Other clients and distributed services on the distributed network can then contact the new distributed service by reference to the potential server entry in the configuration registry.

The new distributed service can, in one embodiment, function as a distributed service servicing local clients without first contacting other distributed services on the distributed network. For example, if the new distributed service is located in a remote area where connection to the remainder of the distributed network is sporadic, then the new distributed service may be able to function as a distributed service for local clients at the remote area until the new distributed service is able to connect to the distributed network. When the new distributed service connects to the distributed network, the new distributed service may be able to download updates, service enhancements, or other information such that the new distributed service may be upgraded to a service level of other distributed services on the distributed network.

The local installation does not add a new entry to the configuration registry or alter the configuration registry. Thus, if it becomes necessary to uninstall the new distributed service, re-install the new distributed service, or repair the new distributed service, a redundant entry will not be added to the configuration registry.

Figure 1:
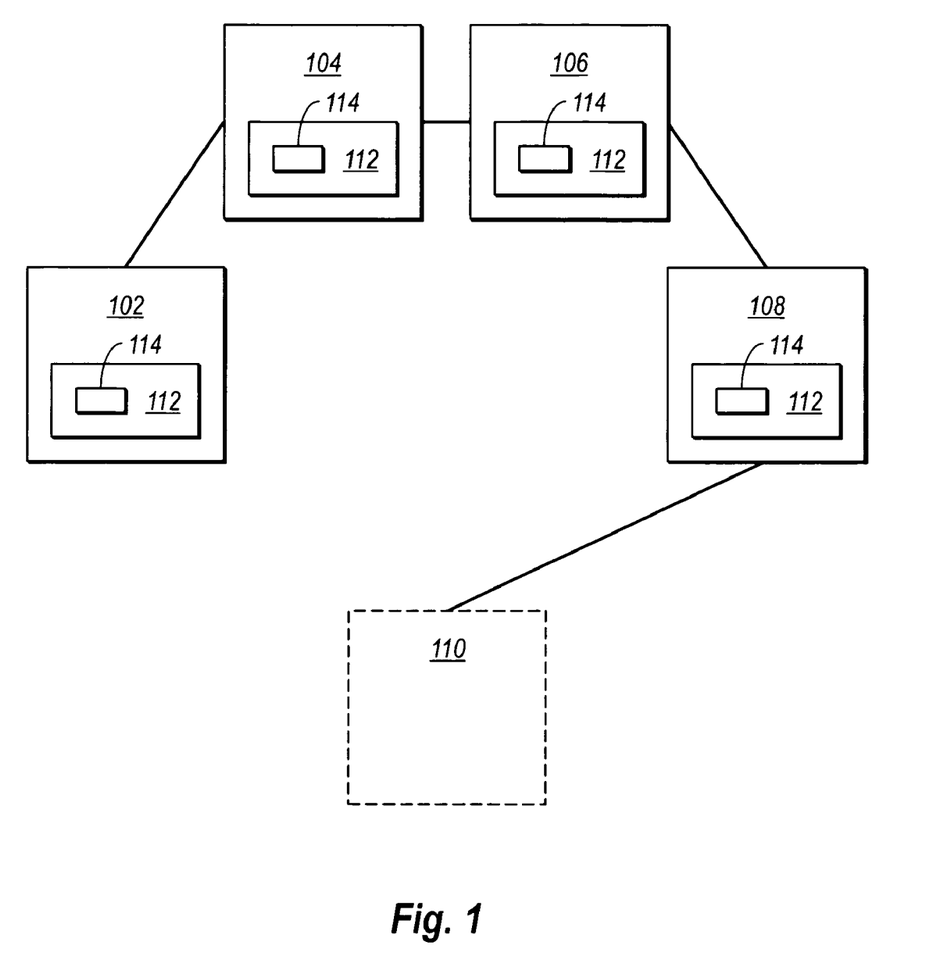
FIG. 1 illustrates a distributed network where new distributed services may be added.

Referring now to FIG. 1, a distributed network 100 is illustrated. The distributed network 100 includes a number of distributed services 102, 104, 106, 108. In one embodiment, each of the distributed services may provide a particular service and may have a particular authorization level in the distributed network 100.

For example, as it relates to a particular service, some of the distributed services may be designed to provide data related to a sales function of an enterprise. Other distributed services may be designed to provide a marketing function of an enterprise. Some of the distributed services on the distributed network 100 may provide the same service but may be located at geographically or logically different locations so as to provide more efficient access to a service offered by the distributed services. For example, in the Active Directory products available from Microsoft Corporation of Redmond Washington, distributed services on a distributed network 100 may be part of a particular domain.

As in relates to authorization level, different distributed services may have different authorization levels that control what a particular distributed service has authorization to do on the distributed network 100. For example, a top level distributed service may have authorization to access, modify, terminate etc. other distributed services on the distributed network 100. In one embodiment, a distributed service may perform operations on distributed services that are at an authority level equal to or less than the authority level of the distributed service.

The following description is now directed to the installation of a new distributed service 110 on the distributed network 100. As described previously herein, installation of a new distributed service is decomposed such that it is performed in at least two disjointed applications steps. The first step is performed as a global installation where a configuration registry is updated with a potential server entry which allows the existence of the new distributed service 110 on the distributed network 100 whether or not the new distributed service 110 actually exists or not. The second step is performed at a machine where the new distributed service 110 will be installed. The second step may also be referred to herein as the local installation.

Illustrating now the global installation, in the example shown in FIG. 1, the global installation may be performed for example at the distributed service 102. The distributed service 102 is shown as including a configuration registry 112. In the example shown, performing the global installation includes adding a potential distributed service entry 114 to the configuration registry 112.

Various pieces of information may be included in the potential distributed service entry 114. Such information may include a DNS name for the new distributed service 110, resources used by the new distributed service 110, a serial number corresponding to the new distributed service 110, permissions for the new distributed service 110, designated users for the distributed service 110, an authority level for the new distributed service 110, a domain or categorization of services provided by the new distributed service 110, a network address for the new distributed service 110, security lifetime parameters for the new distributed service 110, and/or blacklist information for the new distributed service 110.

As described above the potential distributed service entry 114 may include a DNS name for the new distributed service 110. The DNS name provides information such that clients or other distributed services on the distributed network 100 can query a DNS server to discover a network address for the new distributed service 110.

The potential distributed service entry may further include resource information. The resource information may specify resources on the distributed network 100 associated with the new distributed service 110. For example, the DNS information may be included in the resource information as the DNS information is useful for identifying a network address where the now distributed service 110 is located logically in the distributed network 100.

The potential distributed service entry may further include a serial number corresponding to the new potential distributed service 110. The serial number may be used to specifically identify the new distributed service 110.

The potential distributed service entry 114 may also include a permissions entry. The permissions entry may specify the new distributed services 110 ability to access various resources on the distributed network 100.

The potential distributed service entry 114 may further include a designated user entry. The designated user entry may specify a user that is responsible for maintaining the new distributed service 110. The designated user may be given various rights and privileges insofar as it relates to maintaining the new distributed service 110. For example, a designated user may be given one or more rights including rights to install, uninstall, repair, update, and/or various other activities on the new distributed service 110. In one embodiment, designating a user may include designating a network administrator so as to limit various activities at the new distributed service 110 to a high level user. At the other end of the spectrum, the designated user entry may specify that any user may perform various activities at the new distributed service 110. In one alternative embodiment, no designated user entry is included in the potential distributed service entry 114. In one embodiment, installation of the new distributed service 110, as will be discussed in more detailed below, is allowed by virtue of the presentation of appropriate credentials.

The potential distributed service entry 114 may also include an authorization level or server authority level entry. The authorization level entry may specify a level that the new distributed service 110 may operate on the distributed network 100. For example, a distributed network 100 may have varying degrees of upper level distributed services and lower level distributed services. In one example, a lower level distributed service may be referred to herein as a branch level distributed service. Branch level distributed services are less able to access certain resources or to affect changes on other distributed services within a distributed network 100 than upper level distributed services.

The potential distributed service entry 114 may further include a service description such as a domain designation entry. The service description entry describes the services that are, or can be, provided by the new distributed service 110. For example, the service description entry may specify that the new distributed service 110 is a server that distributes marketing data. Alternatively, the service description entry may specify that the new distributed service 110 serves sales data. It should be understood that other designations may also be specified and the enumerations of specific examples herein is not intended to limit the scope of potential designations.

The potential distributed service entry 114 may further include a security lifetime parameters entry. For example, the security lifetime parameters entry may specify the length of time a particular security protocol is valid for the new distributed service 110. The security lifetime parameter specified in the potential distributed service entry 114 may differ from security lifetime parameter specified during the local installation of the new distributed service 110. In one embodiment, the security lifetime of the configuration registry 112 exists for a greater length of time than the security lifetime parameter of the specified for the new distributed service 110. This allows the configuration registry 112 to manage the security lifetime of the new distributed service 110.

The potential distributed service entry 114 may further include blacklist information. For example, the potential distributed service entry 114 may include a specification that a particular new distributed service is to be prevented from sharing or receiving data on the distributed network 100. This may be included as a security feature if installation media for the local installation of the new distributed service 110 falls into improper hands. This can be used to prevent unauthorized users from gaining access to the network by presenting the credentials of the new distributed service 110 when the new distributed service 110 has been compromised.

Notably, the distributed service in the distributed network 100 may receive the potential distributed service entry 114 in the configuration registry 112 in a number of different ways. For example, as shown in FIG. 1 and described previously herein, a top level distributed service, such as distributed service 102 may be used to create the potential distributed service entry 114. As shown in FIG. 1, the distributed service 102 may distribute the configuration registry 112 to the other distributed services 104, 106, 108 in the distributed network 100 where the configuration registry 112 includes the potential distributed service entry 114 for the new distributed service 110.

The global installation will typically be performed by a high level user such as the network administrator for the distributed network 100. This may be done to ensure the security of the network and/or for purposes of having a central authority being able to optimize the network.

The global and local installations each have their own authority level. In one embodiment, the global installation has an authority level that is higher than the authority love of the local installation.

In one embodiment, various class entries in the configuration registry 112 are extended to allow for decomposed installation functionality. For example, within the Active Directory product available for servers from Microsoft Corporation of Redmond Wash., may include extensions to the following classes: Computer, User, and Class Directory Service Agent. The classes may be extended to include the attributes in the following table.

| Attribute Name | Description |
| --- | --- |
| ms-DS-KrbTgt-Link | For a computer, identifies the user object (krbtgt), acting as the domain or secondary domain master secret. Depends on which domain or secondary domain the computer resides in. |
| ms-DS-Has-Full-Replica-NCs | For a Directory instance (DSA), identifies the partitions held as full replicas. |
| ms-DS-Secondary-KrbTgt-Number | For a user object (krbtgt), acting as a secondary domain master secret, identifies the protocol identification number associated with the secondary domain. |
| ms-DS-KrbTgt-Link-BL | Backlink for ms-DS-KrbTgt-Link; for a user object (krbtgt) acting as a domain or secondary domain master secret, identifies which computers are in that domain or secondary domain. |
| ms-DS-Is-Full-Replica-For | Backlink for ms-Ds-Has-Full-Replica-NCs; for a partition root object, identifies which Directory instances (DSA) hold that partition as a full replica. |
| ms-DS-isRODC | For a Directory instance (DSA), Identifies whether the DSA is a Read-Only DSA. |
| ms-DS-KeyVersionNumber | The Kerberos version number of the current key for this account. This is a constructed attribute. |

As described previously herein, the global installation performed, including the creation of the potential distributed service entry 114, is disjointed from the local installation of the new distributed service 110 at a local machine. In other words, the global installation may be performed so as to authorize the existence of the new distributed service 110 on the distributed network 100 without regard to whether or not the new distributed service 110 is ever added to the distributed network 100.

Referring once again to FIG. 1, principles related to the local installation of the new distributed service 110 will be demonstrated. As described previously, the local installation, under normal circumstances, does not affect the global installation. For example, the local installation can be performed irrespective of the global installation having been done. Additionally, the local installation will not change or remove the global installation. While the new distributed service 110 may not have access to the distributed network 100 without the global installation first being performed, the local installation can nonetheless be performed without first performing the global installation.

The local installation may include acts such as running an installer program on various cabinet files, running one or more executable files designed to load server software onto computer readable media at the machine where the new distributed service 110 will reside, providing appropriate credentials, such as a username and password, for authenticating that a user has authority to perform the local installation, and the like.

In one embodiment, as described above, the local installation does not result in new entries being added to the configuration registry 112 duplicating already existing entries for the new distributed service 110. Additionally, the local installation may be performed such that entries in the configuration registry are not changed as a result of the local installation of the new distributed service 110. In fact, the local installation may be performed where no currently active connection exists between the machine where the new distributed service 110 is installed and a machine with a distributed service including the configuration registry 112.

In one embodiment it may be advantageous to allow the new distributed service 110 to service local clients before ever being connected by a communication path to other distributed services in the distributed network 100. For example, the new distributed service 110 may be locally installed in a location where communications are notoriously sporadic. Nonetheless, the new distributed service 110 may be locally installed and allowed to service clients locally prior to connecting to other distributed services on the distributed network 100. When communications between the new distributed service 110 and other distributed services on the distributed network 100 become available, the new distributed service 110 can download updates and/or perform other maintenance functions which require or are more easily performed when the new distributed service 110 is connected to other distributed services in the distributed network 100.

In one embodiment, the new distributed service 110 may receive a copy of the configuration registry 112 including a copy of the potential server entry 114. As discussed previously, the new distributed service 110 may also receive software updates or other data allowing the new distributed service to function with increased and updated functionality.

In one embodiment, the local installation of the new distributed service 110 may be accomplished by using seed media. The seed media may include a data set that includes secret data. The data set may also include non-secret data. The secret data has an associated master key that allows the secret data to be accessible. In one embodiment, the master key may belong to a hierarchy of keys where the master key controls access to a list of lower keys where the lower level keys permit access to different portions of the secret data. In one embodiment, a backup image of the data set may be created where the master key is removed from the data set before the image is created. The image can then be transferred to a new location or system by any appropriate transmission path. Exemplary transmission paths include transmission over a network connection, storage of the data on a physical media such as a CD, DVD or removable hard drive and delivery by courier of the physical media, or any other appropriate path. Once the image is received at the new location or new system, the image can be restored on the new system to implement the new distributed service 110. In one embodiment, the image is restored with the expectation that the master key may never be restored. In this case, the secret data is not accessible. However, any non-secret data continues to be accessible by the system on which the image was restored.

In an alternative embodiment, the image may be received at a new system through the first transmission path previously discussed with the expectation that the master key will be received on an alternate second transmission path. By the image being transmitted on the first transmission path and the master key being transmitted on a second transmission path, an additional layer of security is achieved as either the image or the master key may be compromised without compromising the secret data. In this embodiment, the image may be nonetheless restored without the master key being restored. The non-secret data will continue to be accessible to the system on which the image was restored. However the secret data will not be available to the system until the master key is restored.

Thus, in one embodiment, the new distributed service 110 can be locally installed where the non-secret data is used to implement the functionality intended for the new distributed service 110. In an alternative embodiment, only the master key needed to unlock secret data permitting functionality intended for the new distributed service 110 may be sent to a machine implementing the new distributed service 110. This particular embodiment illustrates a method whereby a single image can be used to implement distributed services of differing functionalities where the differing functionalities can be activated by the inclusion of a master key or by including data in non-secret data to allow the functionality.

The disjointed local installation allows for flexibility installing, repairing, and/or reinstalling. For example, if a repair is needed where server software is reinstalled on the different machine than originally installed on, embodiments can still continue to function. In one embodiment, the global registration is tied to a DNS name. As such, a server can be re-added in any appropriate way, so long as it maintains the same DNS name. In particular, some embodiments allow for the installation to be hardware independent. Installations can be performed on different hard drives, with multiple hard drives, on different machines, at multiple machines and so forth.

Some examples of installation state that is delegated to the local machine administrator are illustrated below. These are examples of aspects of distributed service installation state that is part of the purview of the local server. These installation state elements may be created and destroyed independently of the notion of installation state at higher levels, such as the global installation The local machine administrator may determine presence or absence of optional component files that are part of the distributed service role. The local machine administrator may determine settings in the local machine registry. Such setting may include for example, services, event logs, permission settings, and so forth. The local machine administrator may perform the creation of database storage containers on one or more hard disks on the system.

The local machine administrator may determine alternations of the local security configuration such that the machine is considered (by itself) as a domain controller server instead of an application server. The local machine administrator may perform the restoration of file contents from a backup. For example, in a scenario of a complete machine loss, it is possible to restore the image of the old machine onto a new piece of hardware. The local machine administrator may be enabled to remove the local distributed service role. The local machine administrator may have the ability to configure, alter, and tune the placement of database storage containers for improved performance. The local machine administrator may have the ability to "repair" a local configuration by restoring the local settings to a previous point in time. This includes the ability to "reset" a given server to its "just installed" state, as many times as desired.

The local machine administrator may have the ability to move the image of this operating system installation to another server machine as many times as desired, as long as the previous copy is not allowed to return with the same name. Even if it were, the effects would only be felt at the local site, and would not adversely affect the global state.

Figure 2:
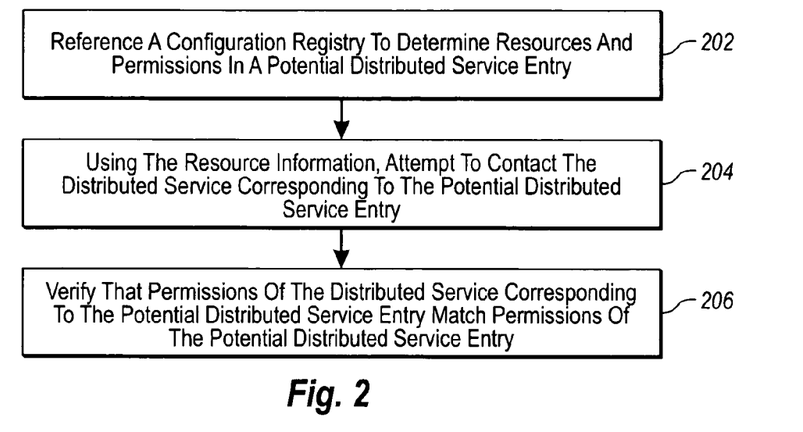
FIG. 2 illustrates a method of communicating with a new distributed service.

Referring now to FIG. 2, a method 200 is illustrated. The method illustrated in FIG. 2 is a method of communicating with a distributed service in a network computing environment. The method 200 may be practiced for example in a network computing environment including distributed services providing services and resources to clients in the computing environment.

The method includes an act of referencing a configuration registry to determine resources and permissions in a potential distributed service entry (act 202). A potential distributed service entry identifies a distributed service corresponding to the potential distributed service entry that is authorized to exist by virtue of an entry in the configuration registry for the potential distributed service entry specifying that the distributed service may exist, whether or not the distributed service corresponding to the potential distributed service entry exists. For example, and referring again to FIG. 1, a potential distributed service entry 114 may exist in a configuration registry 112. The potential distributed service entry 114 may include an entry that specifies that a new distributed service 110 is allowed to exist on the distributed network 100. The entry specifying that a new distributed service 110 is allowed to exist may exist in the potential distributed service entry 114 irregardless of whether or not the new potential distributed service 110 actually exists. As described previously herein, the potential distributed service entry 114 may be embodied as one or more entries in the configuration registry 112. The one or more entries may be entries belonging to different classes of objects for entries of other suitable configurations.

In one embodiment, the potential distributed service entry specifies a designated user for the distributed service corresponding to the potential distributed service entry. For example, the potential distributed service entry may specify a particular individual as an administrator for the new distributed service. In one embodiment, the potential distributed service entry may specify that the designated user is a network administrator for a local network or for the distributed network as a whole.

In one embodiment, the potential distributed service entry specifies a distributed service authority level for the distributed service corresponding to the potential distributed service entry. For example, the potential distributed service entry may specify the distributed service authority level for the distributed service corresponding to the potential distributed service entry is a branch level distributed service. As described previously herein, a branch level distributed service may have less authority to perform certain functions in the distributed network than some other top level global distributed service.

In one embodiment, the potential distributed service entry specifies a domain for the distributed service corresponding to the potential distributed service entry. For example, the potential distributed service entry may specify that a distributed service, has certain specific functionality. For example, a distributed service may be initiated to operate as a server of marketing data.

In one embodiment, the potential distributed service entry specifies a serial number and a DNS name for the distributed service corresponding to the potential distributed service entry. As described previously herein, by identifying the potential distributed service by a DNS name, a distributed service may be reinstalled or repaired on hardware different than the original installation without the need to modify or add a new potential distributed service entry to the configuration registry.

In one embodiment, the potential distributed service entry specifies security lifetime parameters. The security lifetime parameters may differ from security lifetime parameters at the distributed service corresponding to the potential distributed service entry. For example, the potential distributed service entry 114 may include an indication of an expiration for security parameters. The new distributed service 110 corresponding to the potential distributed service entry 114 may also include security lifetime parameters. The security lifetime parameters of the potential distributed service entry 114 do not necessarily need to match those of the new distributed service 110 corresponding to a potential distributed service entry 114.

In one embodiment, the potential distributed service entry specifies that the distributed service corresponding to the potential distributed service entry is blacklisted from the network. This may be useful for example in the case when seed data intended for use in installing a new distributed service 110 on the distributed network 100 becomes lost or intercepted by unauthorized users. By placing an entry in the potential distributed service entry 114, the new distributed service 110 is prevented from performing some or all activities on the distributed network 100.

Referring once again to FIG. 2, the method 200 further includes an act of using the resource information, attempting to contact the distributed service corresponding to the potential distributed service entry (act 204). For example, the potential distributed service entry 114 may specify that a new distributed service 110 has a particular DNS name. By using the DNS name resource, a new distributed service 110 can be identified such that an attempt to contact the new distributed service 110 can be affected.

Referring once again to FIG. 2, the method 200 further includes an act of verifying that permissions of the distributed service corresponding to the potential distributed service entry match permissions of the potential distributed service entry (act 206).

In one embodiment, the method 200 may further include an act of generating the potential distributed service entry. Generating the potential distributed service entry is performed by an entity having appropriate authority to generate potential distributed service entries. For example, a distributed service on the distributed network 100 may provide a network administrator with appropriate tool for creating the potential distributed service entry 114.

The method 200 may further include in an alternative embodiment receiving the potential distributed service entry from another distributed service on the network. For example, if a potential distributed service entry 114 has been created by a network administrator on a distributed service, that distributed service can transmit the potential distributed service entry 114 to another distributed service which eventually attempts communication with the new distributed service 110.

The method 200 may further include sending updates to the distributed service corresponding to the potential distributed service entry to allow the distributed service corresponding to the potential distributed service entry to provide additional functionality as defined by the potential distributed service entry.

Figure 3:
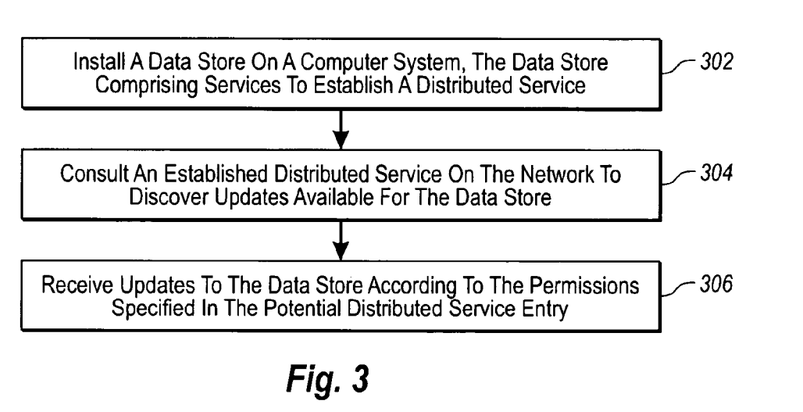
FIG. 3 illustrates a method of downloading additional updates at a new distributed service.

Referring now to FIG. 3, another embodiment of a method 300 is illustrated. The method may be practiced for example in a network computing environment including distributed services providing services and resources to clients in the computing environment. The method includes acts to facilitate establishing a distributed service in the network computing environment. The method includes an act of installing a data store on a computer system (act 302). The data store includes services to establish the distributed service.

Installing a data store on a computer system may include re-installing the data store on the computer system after the data store has previously been installed on a computer system. The re-installation may be performed without requiring an update to the potential distributed service entry or a new potential distributed service entry.

In a similar vein, the method may further include performing maintenance tasks on the data store without requiring an update to the potential distributed service entry or a new potential distributed service entry.

In one embodiment, installing the data store on the computer system may include installing seed media on the computer system. In one embodiment, the seed media may include a data store image including secret data. Access to secret data is controlled by a master key. The master key may have been removed such that the secret data unaccessible. Data not controlled by the master key is accessible.

Referring once again to FIG. 3, the method 300 further includes an act of consulting an established distributed service on the network to discover updates available for the data store (act 304). The updates available for the data store are based on a potential distributed service entry at the established distributed service. The potential distributed service entry specifies permissions for the distributed service. The potential distributed service entry is established independent of installing the data store on the computer system.

The method 300 further includes an act of receiving updates to the data store according to the permissions specified in the potential distributed service entry (act 306).

In one embodiment, the method 300 may further include an act of creating a clone of a distributed service already available in the network computing environment.

Figure 4:
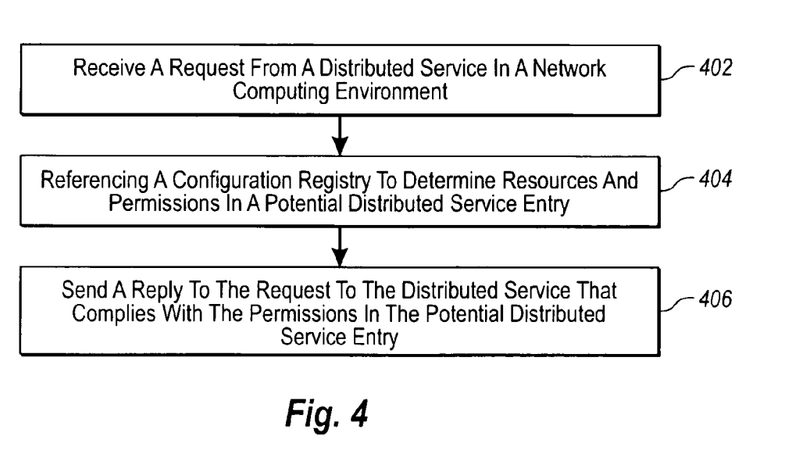
FIG. 4 illustrates a method of communicating with a new distributed service.

Referring now to FIG. 4, a method 400 is illustrated. The method may be practiced for example in a network computing environment including distributed services providing services and resources to clients in the computing environment. The method may include various acts to facilitate communicating between distributed services in the network computing environment. The method includes an act of receiving a request from a distributed service in the network computing environment (act 402). In one embodiment, receiving a request from a distributed service in the network computing environment includes receiving an indication of the permissions of the distributed service.

Referring once again to FIG. 4, the method 400 further includes an act of referencing a configuration registry to determine resources and permissions in a potential distributed service entry (act 404). The potential distributed service entry identifies the distributed service. The distributed service is authorized to exist by virtue of an entry in the configuration registry for the potential distributed service entry specifying that the distributed service may exist. The potential distributed service entry is designed to be such that the distributed service corresponding to the potential distributed service entry may exist or not.

Referring once again to FIG. 4, the method 400 further includes an act of sending a reply to the request to the distributed service that complies with the permissions in the potential distributed service entry (act 406).

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network computing environment including distributed services providing services and resources to clients in the network computing environment, a method of communicating with a distributed service in the network computing environment, the method comprising:

a processor executing the steps of:

receiving an indication that a new distributed service is to be globally installed on a distributed network, the distributed network comprising at least one existing distributed service;

adding a potential distributed services entry to a configuration registry of the existing distributed service, the potential distributed services entry allowing any existing distributed services in the distributed network to be unaffected by local installations of the new distributed service, the configuration registry including an authorization level that controls what the existing distributed service has authorization to do on the distributed network, the potential distributed services entry including resource information specifying resources on the distributed network available to the new distributed service and permissions specifying the new distributed service's ability to access the available resources on the distributed network;

referencing the resource information and permissions in the potential distributed service entry to determine that, the potential distributed service entry identifies the new distributed service as a distributed service that is authorized to be globally installed on the distributed network exist by virtue of an regardless of whether or not the new distributed service is installed locally;

using the resource information, attempting to contact the identified new distributed service corresponding to the potential distributed service entry;

verifying that permissions of the new distributed service match permissions of the potential distributed service entry; and installing the new distributed service globally on the distributed network, such that any existing distributed services in the distributed network are unaffected by local installations of the new distributed service.

2. The method of claim 1, wherein the potential distributed service entry specifies a designated user for the distributed service corresponding to the potential distributed service entry.

3. The method of claim 1, wherein the potential distributed service entry specifies a distributed service authority level for the distributed service corresponding to the potential distributed service entry.

4. The method of claim 2, wherein the potential distributed service entry specifies a distributed service authority level for the distributed service corresponding to the potential distributed service entry as a branch level distributed service.

5. The method of claim 1, wherein the potential distributed service entry specifies a service description for the distributed service corresponding to the potential distributed service entry.

6. The method of claim 1, wherein the potential distributed service entry specifies a network address for the distributed service corresponding to the potential distributed service entry.

7. The method of claim 1, wherein the potential distributed service entry specifies a DNS name for the distributed service corresponding to the potential distributed service entry.

8. The method of claim 1, further comprising generating the potential distributed service entry, wherein generating the potential distributed service entry is performed by an entity having appropriate authority to generate potential distributed service entries.

9. The method of claim 1, further comprising receiving the potential distributed service entry from another distributed service on the distributed network.

10. The method of claim 1, wherein the potential distributed service entry specifies security lifetime parameters that may differ from security lifetime parameters at the distributed service corresponding to the potential distributed service entry.

11. The method of claim 1, wherein the potential distributed service entry specifies that the distributed service corresponding to the potential distributed service entry is blacklisted from the distributed network.

12. The method of claim 1, further comprising sending updates to the distributed service corresponding to the potential distributed service entry to allow the distributed service corresponding to the potential distributed service entry to provide additional functionality as defined by the potential distributed service entry.

13. In a network computing environment including distributed services providing services and resources to clients in the network computing environment, a method of establishing a distributed service in the network computing environment, the method comprising:

a processor executing the steps of:

installing a data store on a computer system, the data store comprising services to establish the a new distributed service;

consulting an established distributed service on the network to discover updates available for the data store;

adding a potential distributed services entry to a configuration registry of an existing distributed service, the potential distributed services entry allowing any existing distributed services in the distributed network to be affected by local installations of the new distributed service, the configuration registry including an authorization level that controls what the existing distributed service has authorization to do on the distributed network, the potential distributed services entry including resource information specifying resources on the distributed network available to the new distributed service and permissions specifying the new distributed service's ability to access the available resources on the distributed network, wherein the potential distributed service entry is established independent of installing the data store on the computer system;

referencing the resource information and permissions in the potential distributed service entry to determine that the potential distributed service entry identifies the new distributed service as a distributed service that is authorized to be globally installed on the distributed network regardless of whether or not the new distributed service is installed locally;

using the resource information, attempting to contact the identified new distributed service corresponding to the potential distributed service entry;

verifying that permissions of the new distributed service match permissions of the potential distributed service entry; and receiving updates to the data store according to the permissions specified in the potential distributed service entry, such that any existing distributed services in the distributed network are unaffected by local updates of the new distributed service.

14. The method of claim 13, wherein installing a data store on a computer system comprises re-installing the data store on the computer system after the data store has previously been installed on a computer system without requiring an update to the potential distributed service entry and/or a new potential server entry.

15. The method of claim 13, wherein installing the data store on the computer system comprises installation using a method of seed media.

16. The method of claim 15, wherein the seed media comprises a data store image comprising secret data where access to secret data is controlled by a master key, and wherein the master key has been removed such that the secret data is inaccessible and wherein data not controlled by the master key is accessible.

17. The method of claim 13, further comprising creating a clone of a distributed service already available in the network computing environment so as to provide additional resources to perform a network computing task and/or for providing resources logically and/or physically closer to clients using the resource.

18. The method of claim 1, wherein the configuration registry includes information that delegates the ability to install and maintain the new distributed service to some particular designated user.

19. The method of claim 1, further comprising:

creating backup image of at least a portion of data corresponding to the new distributed service, wherein a master key that provides access to one or more portions of secret data is removed from the data prior to creating the backup image; and transferring the data to a different distributed service in the distributed network, such that the backup image can be restored on the different distributed service and at least the non-secret data is made accessible by the different distributed service.

20. A computer system comprising the following:

one or more processors;

system memory;

one or more computer-readable storage media having stored thereon computer-executable instructions that, when executed by the one or more processors, causes the computing system to perform a method of communicating with a distributed service in the network computing environment, the method comprising the following:

receiving an indication that a new distributed service is to be globally installed on a distributed network, the distributed network comprising at least one existing distributed service;

adding a potential distributed services entry to a configuration registry of the existing distributed service, the potential distributed services entry allowing any existing distributed services in the distributed network to be unaffected by local installations of the new distributed service, the configuration registry including an authorization level that controls what the existing distributed service has authorization to do on the distributed network, the potential distributed services entry including resource information specifying resources on the distributed network available to the new distributed service and permissions specifying the new distributed service's ability to access the available resources on the distributed network;

referencing the resource information and permissions in the potential distributed service entry to determine that the potential distributed service entry identifies the new distributed service as a distributed service that is authorized to be globally installed on the distributed network regardless of whether or not the new distributed service is installed locally;

using the resource information, attempting to contact the identified new distributed service corresponding to the potential distributed service entry;

verifying that permissions of the new distributed service match permissions of the potential distributed service entry;

installing the new distributed service globally on the distributed network, such that any existing distributed services in the distributed network are unaffected by local installations of the new distributed service;

creating backup image of at least a portion of data corresponding to the new distributed service, wherein a master key that provides access to one or more portions of secret data is removed from the data prior to creating the backup image; and transferring the data to a different distributed service in the distributed network, such that the backup image can be restored on the different distributed service and at least the non-secret data is made accessible by the different distributed service.

* * * * *